United States Patent
Thevenaz

[15] 3,650,596
[45] Mar. 21, 1972

[54] OBJECTIVE INCORPORATING AN IMAGE STABILIZER

[72] Inventor: Jean Thevenaz, Grandson, Switzerland

[73] Assignee: Paillard S.A., Saint-Croix (Vaud), Switzerland

[22] Filed: May 13, 1970

[21] Appl. No.: 36,866

[30] Foreign Application Priority Data

June 6, 1969 Switzerland..........................8634/69

[52] U.S. Cl...................................................350/16, 356/149
[51] Int. Cl...........................................................G02b 23/00
[58] Field of Search...................350/16; 356/148, 149, 248, 356/250

[56] References Cited

UNITED STATES PATENTS

| | | | |
|---|---|---|---|
| 3,475,074 | 10/1969 | Humphrey | 350/16 |
| 3,473,861 | 10/1969 | Humphrey | 350/16 |
| 3,378,326 | 4/1968 | Alvarez | 350/16 |

*Primary Examiner*—David Schonberg
*Assistant Examiner*—Robert L. Sherman
*Attorney*—Emory L. Groff and Emory L. Groff, Jr.

[57] ABSTRACT

An objective chiefly for kinematographic cameras adapted to compensate for untimely shifting of the objective when the camera is held by hand during operation. This compensation is provided by resorting solely to the precession of one or more gyroscopes adapted to rock around an axis with reference to a cage pivotally carried by the objective mount around an axis perpendicular to the axis of the gyroscope, said cage being urged by a spring into a predetermined position and connected with a pivotal optic element incorporated with the objective in a manner such that any angular movement of the cage produced by the precession of the gyroscope causes the pivoting optic element to be shifted with reference to the objective mount to an extent such as will compensate any sudden modification in the angular setting of the optical axis of the objective.

7 Claims, 5 Drawing Figures

Patented March 21, 1972
3,650,596
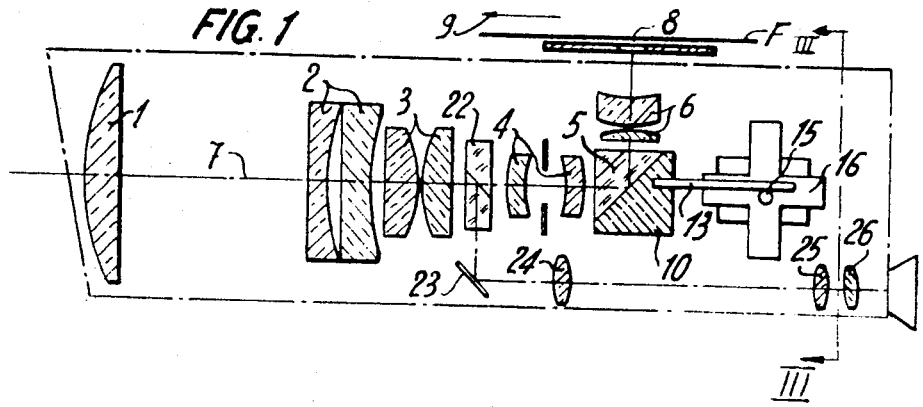
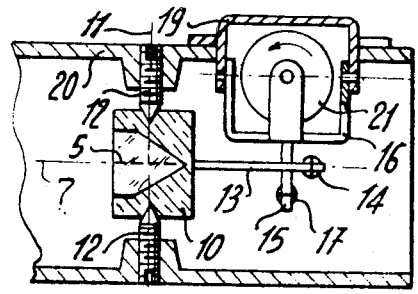
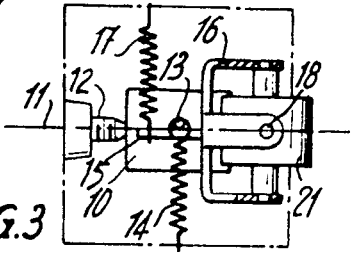
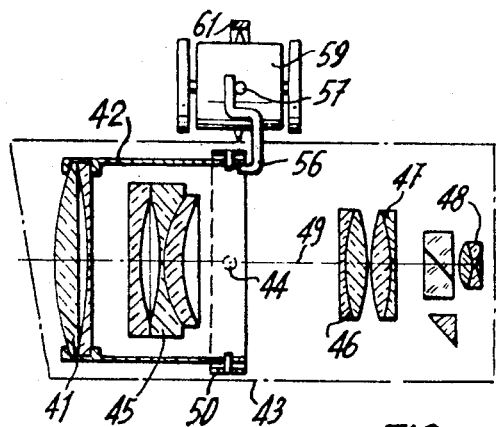
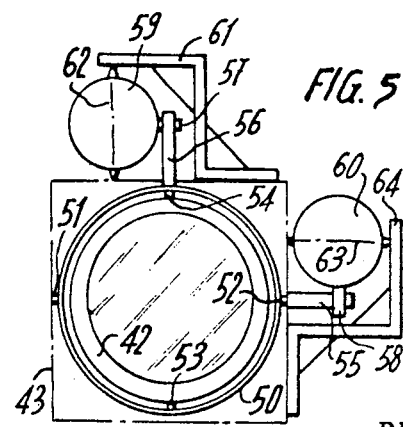
INVENTOR
JEAN THEVENAZ
BY Emory L. Groff Jr.
ATTORNEY

OBJECTIVE INCORPORATING AN IMAGE STABILIZER

The present invention has for its object an objective incorporating a gyroscopic image stabilizer intended more particularly for use in kinematographic cameras, although it may be of interest for other applications such, in particular, as binoculars and field glasses.

It is difficult to hold a kinematographic camera in a perfectly motionless position when the views are taken by hand without the aid of a good tripod. The pictures impressed on the film occupy various positions with reference to the framing gate, and the restoration of said images during the projection of the film is mentally very unpleasant for the spectators.

Picture-stabilizing means have already been proposed, which include a lens carried floatingly inside the objective, and the position of which is controlled by a gyroscope.

Such prior arrangements rely on the properties of gyroscopes carried by a universal joint or a cardan joint so as to permanently retain the angular setting of its rotary axis independently of the movements of its support. Such a stabilization is however difficult to obtain by reason of the precession affecting the gyroscope. Thus, when the axis of the gyroscope is returned elastically into a predetermined position, the return force generates a torque in a plane perpendicular to its plane of action.

The present invention has for its object to eliminate the difficulties arising through such precession phenomena. This object is reached through the fact that the gyroscope is carried by a support pivoting with reference to a single axis, which is perpendicular to the rotary axis of the gyroscope, said support being returned by a spring into a predetermined position and connected with an optical component in a manner such that the angular movements of the support under the action of the precession of the gyroscope transmit to the optical component movements with reference to the objective adapted to compensate the sudden modifications in the angular position of the optical axis of the objective. Thus, only the action of the precession of the gyroscope is resorted to while the property whereby the gyroscope retains the angular setting of its rotary axis is not used directly, but only by means of the precession effect associated therewith.

The accompanying drawings illustrate diagrammatically and by way of example two embodiments of the object of said invention. In said drawings:

FIG. 1 is a vertical cross-sectional view of a first embodiment of a kinematographic objective according to the invention.

FIG. 2 is a partial horizontal sectional view thereof.

FIG. 3 is a partial end view thereof, as seen in the direction of the arrows III-III of FIG. 1.

FIGS. 4 and 5 illustrate in longitudinal cross-sectional view and in front view respectively a second embodiment of an objective according to the invention.

As illustrated in FIGS. 1 to 3, the objective having a variable focal distance includes a front lens 1, two movable groups of lenses 2 and 3, and a rear stationary group of lenses constituted by the lenses 4, a rectangular prism 5 and output lenses 6. The rays entering the objective in parallelism with the optical axis 7 are reflected at 90° by the prism 5 and collected by the output lenses 6 so as to form an image in an exposure gate 8 behind which a film F progresses. Of course, the film is driven stepwise in the direction of the arrow 9 in a well-known manner through means which need not be illustrated.

The rectangular prism 5 is secured to a support 10 adapted to rock around a horizontal axis 11 constituted materially by two alined screws 12. The support 10 is rigid with an arm 13 subjected to the action of a spring 14 which is illustrated in FIGS. 2 and 3, while it is not illustrated in FIG. 1 for sake of clarity. Said arm 13 is thus urged against a transverse arm 15 rigid with the cage 16 of a gyroscope 21 and subjected to the action of the spring 17. The cage 16 is pivotally carried around a transverse axis 18 by a support 19 rigidly secured to the mount 20 of the objective.

The objective is of the type provided for reflex cameras and includes furthermore a semi-reflecting prism 22 adapted to deflect a fraction of the luminous rays towards the finder. The latter is constituted by a mirror 23, a convergent lens 24 and an eye-piece constituted by two convergent lenses 25 and 26. In said first embodiment just described, the triangular prism 5 is pivotally secured around a single axis 11 extending horizontally so that the objective is provided with an image stability compensating for the untimely movements of the objective executed in a vertical plane. When taking a view, the camera is frequently submitted to undesired oscillations, so that the optical axis does not form a perfectly unvarying angle with reference to a vertical plane. Each movement or jarring of the objective produces a corresponding movement of the cage 16 containing the rotor 21 of the gyroscope, this being a consequence of the precession of the gyroscope. This movement of the cage 16 is transmitted by the arms 15 and 13 to the rectangular prism 5 and the latter produces in turn a shifting of the reflected rays which compensates the shifting of the optical axis 7 of the objective. Thus, in spite of undesired movements of a small amplitude of said axis 7 in a vertical plane, the image aimed at by the operator remains in a stable manner within the exposure gate 8.

It should be noted that in this embodiment, the stabilizing effect of the rectangular prism 5 has an influence only on the rays which are to impress the film F. In contradistinction, the rays impinging on the view finder do not benefit by the stabilization, so that the operator may retain a control of the stability of the camera as a whole while he is taking views.

In the embodiment illustrated in FIGS. 4 and 5, the objective includes a front lens 41 carried by a socket 42 secured to the mount 43 by a cardan joint. The front lens 41 may thus pivot in all directions, of course within the limits authorized by the amount 43 around a virtual center 44. The other optical components 45, 46, 47, and 48 of the objective are fitted in a manner such that they remain always alined on the optical axis 49.

The cardan joint between the socket 42 and the mount 43 comprises a ring 50 which is pivotally secured to the fitting 43 by two pivots 51 and 52 defining together a horizontal axis. The socket 42 is in its turn pivotally secured within the ring 50 around a vertical pivotal axis defined by the two pivots 53 and 54.

The socket 42 carries two projections 56 and 55 cooperating with the corresponding projections 57 and 58 carried by cooperating gyroscopes 59 and 60 respectively.

The gyroscope 59 is held between a securing part 61 and the mount 43 and it carries two center punches fitted inside the corresponding notches formed in said securing part and in said mount, so as to define a vertical pivotal axis 62. Similarly, the gyroscope 60 may pivot round a horizontal axis 63 extending between the mount 43 and a securing lug 64.

The projections 55 and 58 as also the projections 56 and 57 are held in mutual contacting relationship by springs which are not illustrated, so as to form an arrangement quite similar to that illustrated in FIG. 3 and including the projections 13' and 16, and the springs 14 and 17.

When the sighting axis of the objective is untimely shifted and executes a slight revolution around a horizontal axis perpendicular to its normal position, the gyroscope pivots round the axis 62 under the action of its precession and its projection 57 acts on the projection 56 so as to cause the front lens 41 to rock round the virtual center 44 in the vertical plane containing the optic axis 49. The shifting of the lens 41 compensates for the movement imparted to the objective in a manner such that the sighting axis retains the desired angular setting.

When the objective executes an undesired movement around a vertical axis, the gyroscope 60 controls a pivotal movement of the front lens 41 round a vertical axis passing through the center 44 in a manner quite similar to what has been described hereinabove, whereby the angular setting of the sighting axis of the objective remains unaltered.

In principle, it is of advantage to compensate for the slow movements thereof, for instance those which accompany of necessity a so-called taking of panoramic kinematographic views. In order to reach said result, the time constant of the elastic return of the gyroscope support should be such that it allows stabilization for the movements or oscillations of the objective, the frequency of which is equal to at least two cycles per second.

I claim:

1. In combination with an objective fitted in a mount, liable to be untimely shifted angularly and including a pivotal optical member, the provision of gyroscopic image-stabilizing means comprising a gyroscope including a cage pivotally secured to the mount around a single axis perpendicular to the axis of rotation of the gyroscope, a spring adapted to urge said cage into a predetermined operative position and to force the pivotal optical member to assume, under the action of the precession of the gyroscope on its cage, an angular position compensating for sudden modifications in the angular setting of the optical axis of the objective.

2. Image stabilizing means as claimed in claim 1, including a second gyroscope, a second gyroscope cage and a second spring, the rotary axes of the gyroscopes with reference to their cages being orthogonal.

3. Image stabilizing means as claimed in claim 1, wherein the pivotal optical member includes a reflecting surface extending across the optical axis of the objective and a support carrying said surface, said support adapted to rock around at least one axis and subjected to the action of said spring.

4. Image stabilizing means as claimed in claim 1, wherein the objective includes a front lens and a rear lens and the pivotal member includes a reflecting surface extending across the optical axis of the objective and a support carrying said surface, said support adapted to rock around at least one axis and subjected to the action of said spring.

5. Image stabilizing means as claimed in claim 1, wherein the objective includes a front lens and a rear lens, and the pivotal optical member includes a rectangular prism extending across the optical axis of the objective, and a support carrying said prism, said support adapted to rock around at least one axis and subjected to the action of said spring.

6. Image stabilizing means as in claim 1, for use in a kinematographic reflex camera provided with means deflecting a fraction of the light passing through the objective towards a view finder, wherein the pivotal optical member is located beyond said deflecting means in the direction of the light passing through the objective.

7. Image stabilizing means as claimed in claim 1, wherein the time constant of the spring acting on the gyroscope cage is sufficiently large for it to compensate for the oscillatory shifting of the objective at a frequency above two cycles per second.

* * * * *